J. M. ATKINSON.
Devices for Ascertaining Leakage in Main and Service Pipes.

No. 157,710.

Patented Dec. 15, 1874.

UNITED STATES PATENT OFFICE.

JAMES M. ATKINSON, OF PITTSBURG, PENNSYLVANIA.

IMPROVEMENT IN DEVICES FOR ASCERTAINING LEAKAGE IN MAIN AND SERVICE PIPES.

Specification forming part of Letters Patent No. 157,710, dated December 15, 1874; application filed October 19, 1874.

*To all whom it may concern:*

Be it known that I, JAMES M. ATKINSON, of Pittsburg, in the county of Allegheny and State of Pennsylvania, have invented a new and useful Improvement in Stop-Cocks for Main and Service Pipes; and I do hereby declare that the following is a full and exact description thereof, reference being had to the accompanying drawings and to the letters of reference marked thereon.

My invention relates to an improvement in device for ascertaining where the leakage is in water-mains and the branches connected to them, whereby it can readily be determined whether the leakage is in the main or branches leading therefrom, by simply turning off the water from the branches at or near the water-main, thereby avoiding the necessity of digging up the streets at points where there is no leakage, for the purpose of finding the leakage caused by flaws or breakage in said mains or branches.

To enable others skilled in the art with which it is most nearly connected to make and use my invention, I will proceed to describe its construction and operation.

Figure 1:
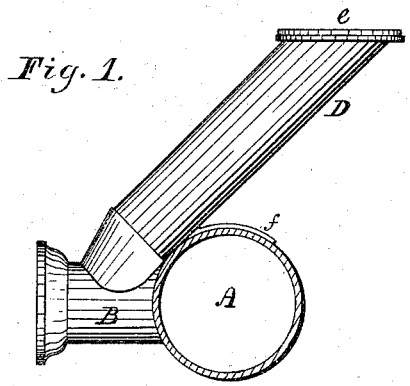
Figure 2:
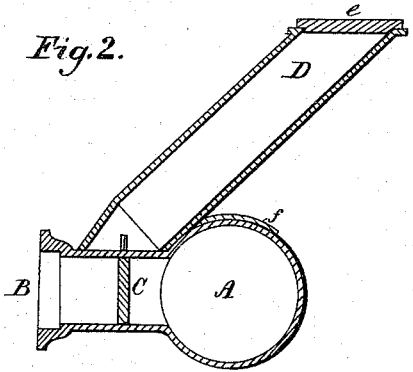

In the accompanying drawing, which forms part of my specification, Figure 1 is a side elevation of my improvement. Fig. 2 is a vertical section of the same.

In the accompanying drawing, A represents an ordinary water-main. B represents a branch leading from the water-main A. This branch, where it is connected to the main A, is furnished with a stop-valve, C, known as a "key-cock," over the upper end of which is placed a pipe, D, extending from the branch B to the surface of the ground or street. The pipe D is inclined, so that the pressure of earth on it will hold its lower end close down on the branch B. The pipe D has a curved flange, *f*, which corresponds to the contour of the main pipe at the point of junction of the branch B. The pipe D has a cap, *e*, which can be removed for the purpose of inserting a key for turning the key-cock or valve C, for the purpose of shutting off the water from the branch B.

In case of leakage from the main pipe or from the branches, the whereabouts of the leakage can be readily ascertained, as the flow of water from a leak frequently travels some distance underground from the point where it started before it rises to the surface of the ground. When a leak is detected it is only necessary to turn off the water from the branches between which the leakage has risen to the surface of the ground, and if the flow of water is stopped it is safe to presume that the leakage is in one of the branches from which the water has been shut off, and the one which leaks can be readily found by alternately shutting off and letting on the water to those branches. If, on the contrary, after the water has been shut off from the branches, the leak still runs, it is safe to presume that the leak is in the main pipe near those branches.

The advantage of my improvement will be readily appreciated by those who are engaged in repairing water-mains and the branches leading therefrom. It often requires the water to be cut off from an entire block to ascertain the leakage in a single branch leading from the main, whereby large factories or many families are cut off from the desired supply of water. My improvement will avoid this, and save labor, time, and expense.

Having thus described my improvement, what I claim as of my invention is—

The combination of the pipe D with the branch pipe B and water-main A, substantially as herein described, and for the purpose set forth.

JAMES M. ATKINSON.

Witnesses:
A. C. JOHNSTON,
PARKER H. SWEET, Jr.